United States Patent

[11] 3,625,541

| [72] | Inventor | Wallace N. Frazier |
| | | 102 Highland Ave., Smyrna, Tenn. 37167 |
| [21] | Appl. No. | 59,875 |
| [22] | Filed | July 31, 1970 |
| [45] | Patented | Dec. 7, 1971 |

[54] INFLATING MECHANISM FOR VEHICLE SAFETY CRASH BAG
10 Claims, 5 Drawing Figs.

[52] U.S. Cl. .................................................. 280/150 AB, 222/5, 137/38
[51] Int. Cl. ................................................... B60r 21/08
[50] Field of Search .......................................... 280/150 AB, 150 B; 222/3, 5; 9/11, 11.1; 296/84; 73/503; 102/73; 137/38

[56] References Cited
UNITED STATES PATENTS

| 2,806,737 | 9/1957 | Maxwell | 280/150 |
| 2,192,450 | 3/1940 | Miller | 222/5 |
| 2,649,311 | 8/1953 | Hetrick | 280/150 |
| 2,860,003 | 11/1958 | Hodges | 296/84 |
| 3,197,234 | 7/1965 | Bertrand | 280/150 |
| 3,414,292 | 12/1968 | Oldberg et al. | 280/150 |
| 3,430,979 | 3/1969 | Terry et al. | 280/150 |

*Primary Examiner*—Kenneth H. Betts
*Attorney*—Cushman, Darby & Cushman

ABSTRACT: A trigger and inflating mechanism for an inflatable safety crash bag of the type which automatically inflates so as to protect a vehicle passenger in the event of a crash comprises a housing containing a rupturable source of gas pressure, a piercing element spring-biased toward the source, and a sear element restraining the piercing element in spaced relationship to the source. The sear element is a rigid projection on a movable inertia member, the latter being restrained against movement by frangible plastic tabs which break upon the inertia member's undergoing a predetermined deceleration.

PATENTED DEC 7 1971

INVENTOR
WALLACE N. FRAZIER

BY Cushman, Darby & Cushman
ATTORNEYS

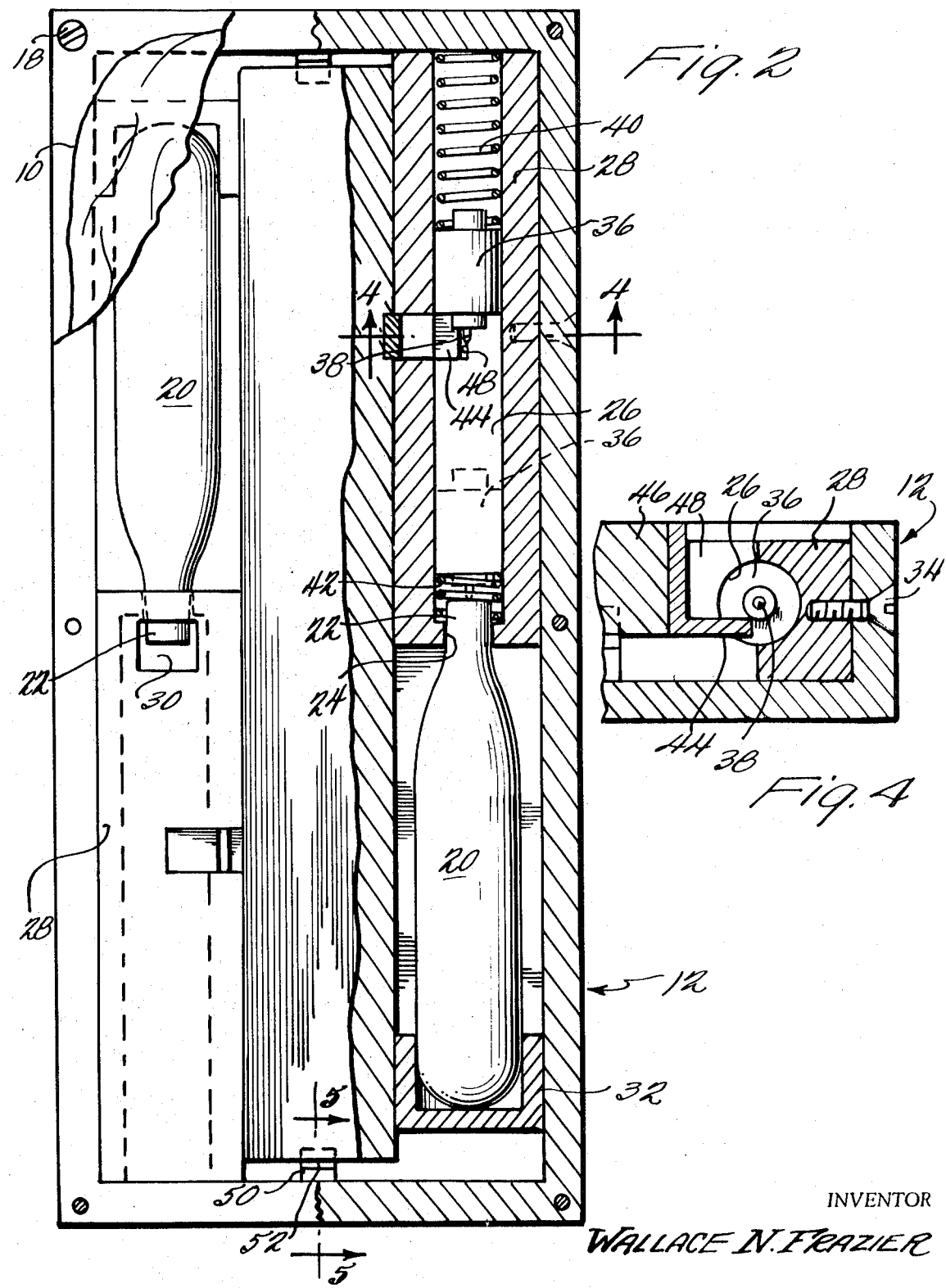

3,625,541

INFLATING MECHANISM FOR VEHICLE SAFETY CRASH BAG

This invention relates to inflatable crash bag devices and in particular to an improved actuator or trigger for releasing pressurized gas from a source thereof into the inflatable bag.

Inflatable safety crash bag devices are employed for cushioning the driver and/or passengers of vehicles, particularly passenger cars, in the event of a collision. A typical device includes as its essential components a source of gas pressure, a normally deflated flexible plastic bag which may be installed on the dashboard, steering post or elsewhere in the vehicle, and an actuator or trigger mechanism which rapidly inflates the bag in response to a predetermined deceleration of the vehicle. The bag inflates within a few microseconds and provides a cushion between the driver or passenger and the interior of the vehicle.

The actuator or trigger of such safety devices are often operated by an inertia member which is mounted so as to undergo limited movement relative to other parts of the mechanism when the vehicle undergoes a high deceleration. The movement of the inertia member may initiate operation of the mechanism through a mechanical linkage or an electrical circuit. The present invention provides an improved actuator of the mechanical type in combination with a compact arrangement of bag and pressure source.

In accordance with the principles of the present invention there is provided a safety crash bag device having a container of pressurized gas, a spring-operated piercing member adapted to pierce the container when triggered and a trigger mechanism which includes a relatively heavy inertia member in engagement with the piercing member and normally restraining the latter against the action of the spring. The inertia member is normally prevented from moving means of frangible tabs or the like which break under the force of the member in the event of a deceleration of the vehicle of predetermined magnitude. In the preferred embodiment the pressure source, piercing element and inertia member are mounted within a common housing which is provided with a gas outlet aperture, and the mouth of the deflated bag is sealed to the exterior of the housing around the outlet aperture. The entire assembly may be then mounted in the center of the steering wheel or on the dashboard of the vehicle with the deflated bag facing the driver and/or front seat passenger.

The invention will be further understood from the following detailed description of an illustrative embodiment taken with the drawings in which:

FIG. 2 is a top plan view, on an enlarged scale and partly broken away, of the crash bag device of FIG. 1;

Figure 1:
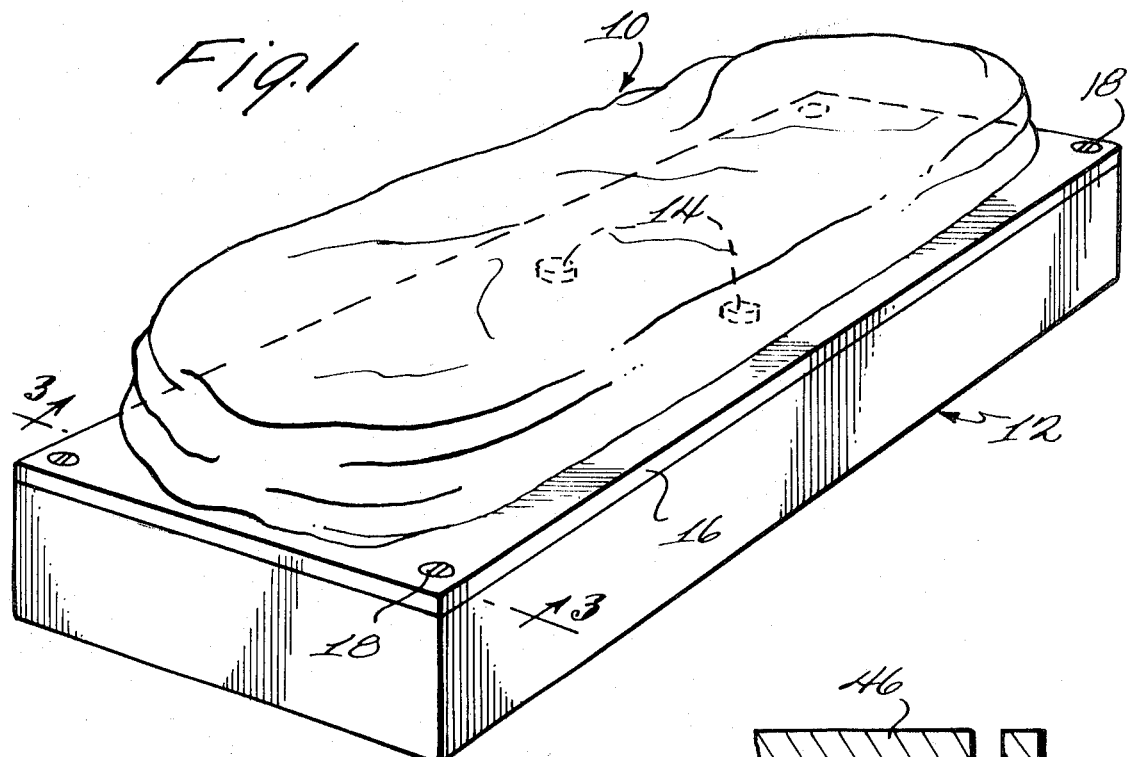
FIG. 1 is a perspective view of a safety crash bag device embodying the principles of the present invention.
Figure 5:
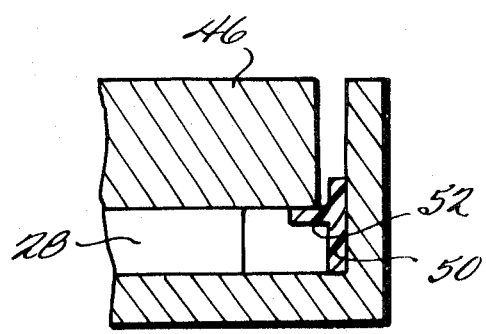

FIGS. 4 and 5 are partial sectional view taken on the lines 4—4 and 5—5 respectively of FIG. 2.

As shown in the drawings the safety crash bag device of this invention may be constructed compactly in the form of a deflated bag 10 attached to a housing 12 which encloses a source of gas pressure and an inertia-operated trigger mechanism. The mouth of the bag 10 is sealed in any suitable manner to the exterior of the housing 12 in surrounding relationship to a gas outlet aperture 14 in the housing 12. In the illustrated embodiment the housing 12 is boxed shaped with the bag 10 attached to and overlying the top surface thereof. In its operative position in a motor vehicle the housing 12 may be attached to the upper end of the steering post or to the dashboard on the passenger side in a position such that the bag 10 faces the driver or passenger, respectively. Upon inflation the bag 10 forms a small cushion between the driver or passenger and the windshield and associated structure. The bag 10 will normally be relatively small so as not to interfere with operation of the vehicle in the event that the device is fired accidentally.

The housing 12 may be of any convenient shape and construction and as shown in the illustrated embodiment is a rectangular box having a top cover plate 16 removable secured and sealed in place as with screws 18.

The gas pressure source is conveniently provided in the form of two compressed gas cartridges 20 of the type having a sealing element at one end adapted to be pierced when release of the gas is desired. In the illustrated embodiment the cartridges 20 are disposed in the same plane on opposite sides of the housing, with their sealed ends 22 facing inwardly. Each sealed end 22, which is of reduced cross section, fits in the reduced open end 24 of a cylindrical bore 26 in a support block 28 with the shoulder of the cartridge in engagement with the periphery of the bore 26 so as to align the cartridge 20 with the bore 26. A gas escape aperture 30 extends between the bore 26 and the upper surface of each block 28. The opposite end of each cartridge 20 is supported in any suitable manner, as with an adjustable retainer member 32. The support blocks 28 may be separate pieces secured in place as by screws 34, or they may be integral with the walls and bottom of the housing 12.

The A for piercing the sealed end 22 of each gas cartridge 20 includes a cylindrical piercing element 36 slidably retained within the bore 26 of the respective support block 28. a pin 38 projecting axially from the end of the element 36 facing the cartridge 20 is aligned with the sealed end 22 of the cartridge 20. In the cocked position of the device the piercing element 36 is retained in the full-line position shown in FIG. 2 against the action of a spiral compression spring 40 disposed in the bore 26. In the uncocked position the piercing element 36 assumes the phantom-line position in which the pin 38 is spaced axially from the cartridge end 22 by a second, shorter spiral spring 42 disposed in the bore between the reduced open end 24 and the piercing element 36. The second spring 42 will be initially compressed by the piercing element 36 upon firing of the device and will then force the element 36 in the opposite direction toward the plantom-line position so as not to interfere with the escape of gas from the cartridge 20.

Each piercing element 36 is normally held in its cocked position by a sear 44 on a common movable inertia member 46. As best seen in FIGS. 2 and 5 each sear 44 is a finger extending laterally from the inertia member 46 and projecting through a slot 48 in the respective support block 28 and into the bore 26 of the latter. The outer end portion of the sear 44 thereby partially obstructs the bore 26 and is engaged by the forward end of the respective piercing element 36 when the latter is in its cocked position. Upon downward movement of the inertia member 46 the sear 44 moves out of the bore 26 are releases the piercing element 36. In the illustrated embodiment each sear 44 is part of an L-shaped element fixed within a groove in the inertia member 46.

Figure 3:
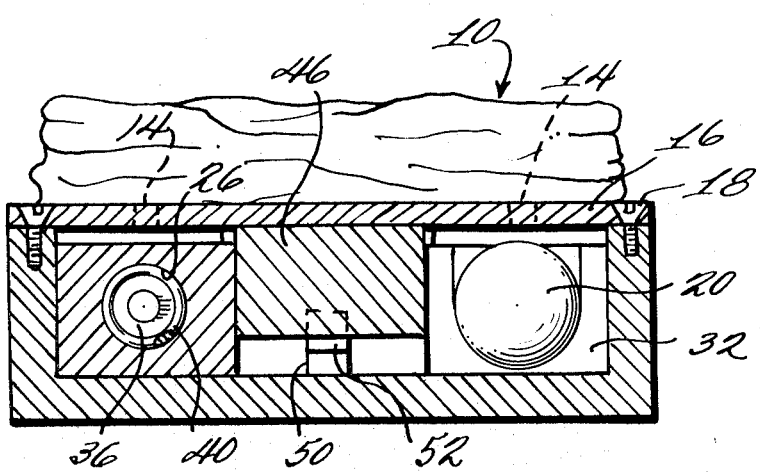
FIG. 3 is a sectional view taken on the line 3—3 of FIG. 2.

The inertia member 46 is a relatively massive metal bar extending the length of the housing 12 in a position between the support blocks 28 and adapted for limited vertical movement relative thereto as viewed in FIGS. 3, 4 and 5. The member 46 is normally retained in a raised position, as shown in these Figures, by frangible support means, such as plastic tabs 50, disposed between the bottom of the housing 12 and the lower surface of the member 46. The tabs 50 are constructed to break under the force applied thereto by the inertia member 46 when the assembly undergoes a predetermined deceleration, such as a deceleration of 4g, in a direction vertically downward as viewed in FIG. 4. Each tab 50 may conveniently be made in the shape of a I and disposed at the ends of the inertia member 46 whereby the leg portions 52 of the tabs 50 will be seared off by movement of the inertia member 46.

The operation of the safety device is apparent from the above description and need only briefly summarized. The housing 12 will normally be attached to the vehicle in a position such that the deflated bag faces the driver or a passenger and such that the bottom of the housing 12 faces forwardly. In the event of a collision the forward momentum of the inertia member 46 and the resulting forces on the legs 52 of the tabs 50 shears off the legs 52 so that the inertia member 46 moves downwardly as viewed in FIGS. 3, 4 and 5. Each sear 44, being unitary with the inertia member 46, moves away from its respective piercing element 36 whereupon the latter is rapidly projected toward the respective gas cartridge 20 by the main spring 40. The momentum of the piercing element 36 compresses the secondary spring 42 against the shoulder at the reduced end 24 of the bore 26, and the pin 38 punctures the seal of the cartridge 20. The secondary spring 42 then forces the piercing element 36 away from the cartridge 20 so that there is no restriction to the escape of gas from the cartridge 20. The compressed gas flows out of the cartridge 20, through the apertures 30 in the support blocks 28, through the gas outlet aperture 14 in the cover plate and into the bag 10, causing the latter to inflate.

The device may be rearmed by removing the cover plate 16, replacing the cartridges 20 and frangible tabs 50 and cocking the piercing elements 36 against the springs 40.

It is claimed:

1. In an inertia-actuated safety crash bag assembly for a vehicle of this type including an inflatable bag and inflating means responsive to a predetermined deceleration of the vehicle for rapidly inflating the bag from a rupturable source of gas pressure, the improved inflating means which comprises: spring-operated piercing means including spring means and a piercing member, said piercing means having a first position in which the piercing member is spaced from said gas pressure source and a piercing position in which the piercing member is in piercing engagement with said gas pressure source under the biasing force of said spring means; a sear element normally holding said piercing means in its first position; an inertia member unitary with said sear element and movable from a normal position to an actuated position when said assembly undergoes a predetermined deceleration and operable upon movement to said actuated position to mechanically move said sear element away from said piercing means; and frangible means normally restraining said inertia member in its normal position and frangible under the force of the decelerating inertia member so as to permit the latter to move toward its actuated position.

2. Apparatus as in claim 1 wherein said spring means is constructed and arranged to remove its biasing force before said piercing member reaches its piercing position whereby the inertia of said piercing member carries it to its piercing position and whereby said piercing member is thereafter free to move away from said gas pressure source so as not to obstruct flow of gas from said source.

3. Apparatus as in claim 2 including additional spring means acting on said piercing member only when the latter is near its piercing position and arranged to store energy as said piercing member reaches said position so as to move said piercing member away from said gas pressure source after the latter has been pierced.

4. Apparatus as in claim 1 including guide means associated with said inertia member for limiting movement of the latter in a straight line and guide means associated with said piercing means for limiting movement of said piercing member in a straight line which is at a right angle to the direction of movement of said inertia member, said sear element extending from said inertia member and obstructing movement of said piercing member.

5. Apparatus as in claim 4 including a rigid housing enclosing said inertia member, said frangible means, said piercing means and both said guide means, said housing having at least one gas outlet for permitting gas to escape when the gas pressure source is pierced.

6. Apparatus as in claim 4 wherein said inertia member is an elongated body and wherein the guide means associated therewith guides the body for movement in a direction transverse to the longitudinal direction of the body.

7. In an inertia-actuated safety crash bag assembly for a vehicle of the type including an inflatable bag and inflating means responsive to a predetermined deceleration of the vehicle for rapidly inflating the bag from a rupturable source of gas pressure, the improved inflating means which comprises: a piercing member movable between a cocked position spaced from said gas pressure source and a piercing position in engagement with said gas pressure source; spring means for applying a force to said piercing member in a direction to move the latter from its cocked position toward its piercing position; a movable sear element normally restraining said piercing member against the biasing action of said spring means and holding said piercing member in its socked position; an inertia member movable from a normal position to an actuated position when said assembly undergoes a predetermined deceleration and operable upon movement to said actuated position to mechanically move said sear element away from said piercing member; frangible means normally restraining said inertia member in its normal position and frangible under the force of the decelerating inertia member so as to permit the latter to move toward its actuated position, a rigid housing enclosing said gas pressure source and said improved inflating means, said housing having at least one gas aperture therethrough to permit gas to escape when said gas pressure source is pierced, said inflatable bag being sealed to said housing in a position to receive the gas issuing from said aperture.

8. Apparatus as in claim 7 wherein said housing is of flattened boxlike construction including a removable top wall of substantial area and sidewalls defining the perimeter of said housing, said top wall being provided with said gas aperture, and said inflatable bag being sealed to said perimeter of said housing.

9. In an inertia-actuated safety crash bag assembly for a vehicle of this type including an inflatable bag and inflating means responsive to a predetermined deceleration of the vehicle for rapidly inflating the bag from a rupturable source of gas pressure, the improved inflating means which comprises: a piercing member movable in a given direction between a cocked position spaced from said gas pressure source and a piercing position in engagement with said gas pressure source; spring means for applying a force to said piercing member in a direction to move the latter from its cocked position toward its piercing position; a movable sear element normally restraining said piercing member against the biasing action of said spring means and holding said piercing member in its cocked position; an elongated inertia member mounted adjacent and in the same plane as said piercing member, said inertia member being movable, in a direction which is transverse to its longitudinal axis and at the same time parallel to said given direction from a normal position to an actuated position when said assembly undergoes a predetermined deceleration and operable upon movement to said actuated position to mechanically move said sear element away from said piercing member, said sear element being unitary with and projecting laterally from said inertia member into engagement with a shoulder on said piercing member when the latter is in its cocked position; and frangible means normally restraining said inertia member in its normal position and frangible under the force of the decelerating inertia member so as to permit the latter to move toward its actuated position.

10. In an inertia-actuated safety crash bag assembly for a vehicle of the type including an inflatable bag and inflating means responsive to a predetermined deceleration of the vehicle for rapidly inflating the bag from a rupturable source of gas pressure, the improved inflating means which comprises: an elongated housing having a longitudinal dimension, a width dimension, and a thickness dimension of lesser magnitude than the longitudinal dimension; a movable elongated inertia member disposed longitudinally within said housing, said inertia member having a sear element fixed to and projecting from said member in a direction parallel to the width dimension of said housing; guide means associated with said inertia member for guiding the latter for movement in a direction parallel to the thickness direction of said housing; means normally restraining said inertia member in a first position and releasable under the force of said inertia member in the event of a predetermined deceleration of the housing in a direction parallel to said thickness dimension whereby said inertia member moves to a second position; spring-biased piercing means normally restrained in an inactive position by said sear element when said inertia member is in said first position and releasable upon movement of said inertia member to said second position, said piercing means including a piercing member moveable under force of a spring into piercing engagement with the gas source and further including guide means associated with said piercing member for guiding the latter for movement in a direction parallel to said longitudinal dimension of said housing.

* * * * *